E. D. CASE.
CHECK OVERFLOW FITTING.
APPLICATION FILED JAN. 24, 1912.
1,058,033.
Patented Apr. 8, 1913.
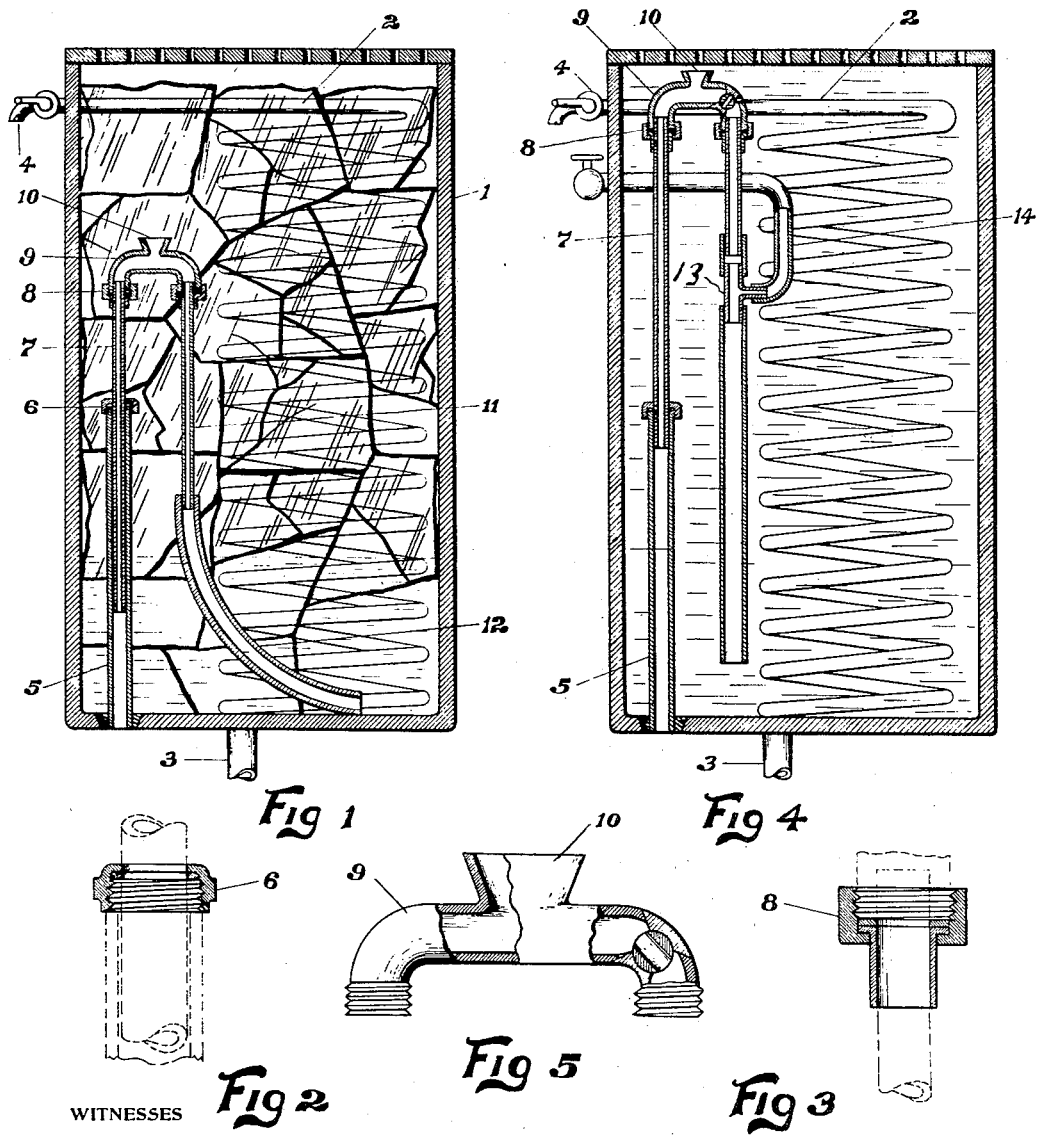

UNITED STATES PATENT OFFICE.

EDGAR D. CASE, OF FLINT, MICHIGAN.

CHECK OVERFLOW-FITTING.

1,058,033.  Specification of Letters Patent.  Patented Apr. 8, 1913.

Application filed January 24, 1912. Serial No. 673,233.

*To all whom it may concern:*

Be it known that I, EDGAR D. CASE, a citizen of the United States, residing at Flint, in the county of Genesee and State of Michigan, have invented certain new and useful Improvements in Check Overflow-Fitting, of which the following is a specification.

The object of my invention is to provide an adjustable outlet for a tank that will take the overflow of liquid from the bottom of the tank and will maintain the level of the liquid in the tank at any desired depth.

Another object of my invention is to prevent a siphon from forming at any time.

Another object of my invention is to adapt the use of the overflow to a tank that is cooled by either ice or water.

Another object of my invention is to provide an adjustment therein that will prevent the overflow from being taken from the bottom of the tank at will and to take the overflow from the top of the tank.

Another object of my invention is to provide an adjustment permitting a double use of the tube that drains from the bottom of the tank, so that it can be used either to supply water to the bottom of the tank or take water from the bottom of the tank.

These and other objects of my invention are fully illustrated in the drawings, described in the specification and pointed out in the claims at the end thereof.

In the accompanying drawings, Figure 1 is a cross section of a tank showing my improved drainage tube. Figs. 2 and 3 are details of a stuffing box for packing the joint between the fixed tube and the adjustable tube. Fig. 4 shows a section of the tank containing a modification of the drainage tube in which it serves both as a supply tube and a drainage tube. Fig. 5 is a large detail view of the overflow fitting.

In the accompanying drawings like reference numerals indicate like parts.

In the drawings my invention is shown applied to a tank containing one or more series of pipes submerged in water, brine or other cooling substance, such as is ordinarily used for cooling beer and other similar liquids. As indicated in Fig. 1, reference numeral 1 indicates such a tank.

2 indicates a coil of pipe extending spirally from the top of the tank to the bottom and having the intake 3 through the bottom of the tank and the outlet 4 at the top of the tank, this being the type of tank that is frequently used in dispensing beer, in which case the pipe 3 would connect with the keg of beer in the cellar of a saloon, into which pipe the beer would be forced by air pressure out of the keg of beer, the beer flowing up through the pipe to the outlet 4 at the bar. The pipe 2 is made long enough and with sufficient cooling surface to cause the beer to be cooled during its upward flow through the tank, so that it can be dispensed at the bar at an attractive temperature.

In the summer time the tank 1 will ordinarily be filled with blocks of ice clear to the top, the top of the tank being hinged or removable to permit of the addition of ice to the tank.

It is desirable to retain a certain amount of the water which melts from the ice in the tank, and to drain off the balance. It is also well known that water acquires its greatest density at a temperature of four degrees centigrade, and if the water is therefore melted from the ice at zero temperature centigrade, the coldest water will be on top of the water as it cools in the bottom of the tank, and the warmest water will be on the bottom. It is for the purpose of removing the water from the bottom of the tank that my apparatus is provided, as follows: Mounted stationary in the bottom of the tank and sealed so as to be water tight therein, is the drain pipe 5 which has a connection with the sewer. In the top of this drain pipe is placed the stuffing box 6, by which a tight connection is made between the adjustable tube 7 and the stationary tube 6, permitting a vertical adjustment of the tube 7 and maintaining the joint between the tubes 6 and 7 tight so as to prevent the leaking of water therethrough.

On top of the tube 7 is placed the stuffing box 8, to the top of which is connected the check overflow fitting 9. This check overflow fitting is composed of a single tube inverted U shaped, having spigot openings with male threads on each end. In the middle of the yoke of the inverted U and projecting upwardly, is the funnel shaped opening 10, communicating directly with the opening which passes through the fitting. To the end of the fitting opposite the tube 7 is connected the tube 11 which is preferably of metal and rigid, and to the bottom of which is connected a flexible tube or hose 12.

With the parts assembled as above described and as shown in Fig. 1, the ice can be filled into the tank and the water will accumulate to the level of the bottom of the check overflow fitting 9, after which the water will pass out through the drain tubes 7 and 5 as rapidly as the ice melts. It will be understood of course that the tank will frequently be piled full of ice, so that the ice extends loosely from the bottom of the tank to the top and is not usually in the ordinary sense of the term floating in the water in the bottom of the tank. After the ice has become melted to a considerable extent, additional ice may be added to the tank, causing the level of the water to rise. In this case the water will rise above the funnel opening 10 in the fitting and will flow therethrough directly down the drain pipes 7 and 5 into the sewer, and will continue so to flow until the excess of water has fully passed off, after which the flow will be only what rises through the flexible tube 12 from the bottom of the tank.

The opening 10 is for the purpose of rapidly removing the excess of water and is for the purpose of breaking a siphon that otherwise might form after the excess of water had begun to flow off and which if not broken would drain all of the water out of the tank. As shown by my apparatus the surplus water will be removed at once and thereafter only the water that is warmest and which has settled to the bottom of the tank will be removed.

Ice is used for cooling beer during the summer time, but in the winter time when hydrant water is sufficiently cold, it is frequently used for the cooling of the beer instead. In this case it is desirable to reverse the order of drainage as the warmest water will then be found at the top of the tank and the coldest water will be found at the bottom of the tank. To provide for such a contingency I place a T 13 in the tube 11, which is connected by the pipe 14 with the water supply pipe 15 connected to the city water mains. I also place a stop cock 16 in the check overflow fitting 9 which prevents the water then from rising through the tube 11 and causes it to flow down through the flexible tube 12 to the bottom of the tank. The water can then rise in the tank 1 until it reaches the level of the funnel opening 10 in the top of the overflow fitting 9, into which it can pass, passing down through the tubes 7 and 5 into the sewer outlet.

Because of the sliding connection between the tubes 7 and 5, the overflow fitting 9 can be placed at any desired height, so that the depth of water retained in the tank to which the cooling pipe is exposed can be varied at will. In the summer time a large quantity of ice and a considerable depth of water would be necessary in order to insure proper cooling of the beer, due to the fact that the temperature of the atmosphere is high and that the beer is drawn rapidly, while in the winter time when water alone is being used and the temperature of the atmosphere is normally low and the quantity of beer drawn is considerably smaller, a lower water level without the use of ice would be sufficient to lower the temperature of the beer or other liquid that was being passed through the refrigerating coils. The pipe 14 may be connected to a separate independent pipe or it may be connected to the pipe through which the water at the bar is supplied, and which pipe may be a spiral submerged pipe which in turn during the summer time would be cooled by its immersion in this same tank.

If desired a cork with a small air hole may be inserted in the overflow opening when the connections are arranged as shown in Fig. 1. This will force practically all the overflow water to be taken from the bottom of the tank and when the level drops to the fitting the air will work into the fitting through the cork and break the siphon. It is also desirable that part or all of the connection 14 be made flexible so as to permit vertical adjustment of the fitting when the parts are arranged as shown in Fig. 4, as well as when used as shown in Fig. 1.

Having thus described my invention, what I claim as new and patentable is as follows:

1. The combination of a tank having a discharge outlet therein, an overflow fitting within said tank, said fitting having the shape of an inverted U, the ends thereof projecting downwardly, and a funnel shaped opening in said fitting projecting upwardly.

2. The combination of a tank having a discharge outlet therein, an overflow fitting within said tank, said fitting having the shape of an inverted U, the ends thereof projecting downwardly, and a funnel shaped opening in said fitting projecting upwardly, an adjustable member adapted to connect one side of said U with the discharge outlet of the tank, and a second connection adapted to extend from said U to the bottom of the tank, said second connection having a flexible portion.

3. The combination in an article of manufacture of an overflow fitting for a cooling tank, said fitting having the shape of an inverted U, the ends thereof projecting downwardly, and a funnel shaped opening in the top of said fitting projecting upwardly.

In testimony whereof I affix my signature in presence of two witnesses.

EDGAR D. CASE.

Witnesses:
LENA M. ASH,
ALICE M. JOHANNS.